(12) United States Patent
Ishii et al.

(10) Patent No.: US 7,866,429 B2
(45) Date of Patent: Jan. 11, 2011

(54) TRAVELING APPARATUS (75) Inventors: Shinji Ishii, Yokohama (JP); Ikuo Yamano, Yokohama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 229 days.

(21) Appl. No.: 12/078,848

(22) Filed: Apr. 7, 2008

(65) Prior Publication Data
US 2008/0245594 A1 Oct. 9, 2008

(30) Foreign Application Priority Data
Apr. 5, 2007 (JP) ............................. 2007-099616

(51) Int. Cl.
*B62D 61/00* (2006.01)
*B60K 1/00* (2006.01)

(52) U.S. Cl. ..................... 180/218; 180/65.8; 180/65.51

(58) Field of Classification Search ................ 180/218, 180/65.8, 65.51
See application file for complete search history.

(56) References Cited

U.S. PATENT DOCUMENTS

| | | | | |
|---|---|---|---|---|
| 5,791,425 A * | 8/1998 | Kamen et al. | ................. | 180/7.1 |
| 5,971,091 A * | 10/1999 | Kamen et al. | ................. | 180/218 |
| 6,435,535 B1 * | 8/2002 | Field et al. | .................. | 280/204 |
| 6,571,892 B2 * | 6/2003 | Kamen et al. | ................. | 180/8.2 |
| 6,837,327 B2 * | 1/2005 | Heinzmann | .................. | 180/218 |
| 7,004,271 B1 * | 2/2006 | Kamen et al. | .................. | 180/21 |
| 7,174,976 B2 * | 2/2007 | Kamen et al. | .............. | 180/19.1 |
| 7,370,713 B1 * | 5/2008 | Kamen | ......................... | 180/7.1 |
| 7,407,175 B2 * | 8/2008 | Kamen et al. | ................ | 280/204 |
| 7,481,291 B2 * | 1/2009 | Nishikawa | ................... | 180/218 |

FOREIGN PATENT DOCUMENTS

| JP | 2004-074814 A | 3/2004 |
|---|---|---|
| JP | 2004-276727 | 10/2004 |
| JP | 2005-006435 A | 1/2005 |
| JP | 2005-145296 A | 6/2005 |
| JP | 2007-176398 A | 7/2007 |

* cited by examiner

*Primary Examiner*—Lesley Morris
*Assistant Examiner*—Marlon A Arce
(74) *Attorney, Agent, or Firm*—Kenyon & Kenyon LLP (57) ABSTRACT

A coaxial two-wheeled vehicle includes a plurality of wheels disposed in parallel, a vehicle body, at least one of a step plate and a seat, an operating member, and a mechanism. The vehicle body supports plurality of wheels rotatably. The step plate is coupled to the vehicle body to carry a driver in an upright attitude. The seat is coupled to the vehicle body to seat the driver. The operating member is coupled to the vehicle body and operated by the driver for inputting driver's operation including an accelerating operation and a decelerating operation. The mechanism is configured to move at least one of the step plate and the seat in a front-rear direction of the vehicle body in accordance with an operation of the operating member.

7 Claims, 13 Drawing Sheets

TRAVELING APPARATUS

BACKGROUND OF THE INVENTION

1. Field of the Invention

The present invention relates to a traveling apparatus suitable for use in a coaxial two-wheeled vehicle having two wheels disposed on an identical axial center line, for example.

2. Description of Related Art

In a conventional coaxial two-wheeled vehicle, attitude control is performed on the vehicle mainly in a pitch axis direction by detecting the tilt of the vehicle using a plurality of gyros or the like (see U.S. Pat. No. 5,971,091, for example).

An apparatus that performs travel control in a coaxial two-wheeled vehicle in accordance with load movement generated by a driver is also known (see Japanese Unexamined Patent Application Publication No. 2005-6435, for example).

An apparatus in which a coaxial two-wheeled vehicle is provided with a seat has also been proposed (see Japanese Unexamined Patent Application Publication No. 2004-74814, for example).

In a traveling apparatus for a coaxial two-wheeled vehicle such as those described above, travel control is performed in accordance with load movement generated by the driver, for example. In this case, brake control is performed when a rearward load is applied, while accelerator control is performed when a forward load is applied. In contrast, it has been proposed that manual brake and accelerator operations be made possible in a traveling apparatus for a coaxial two-wheeled vehicle such as those described above. Specifically, by providing an operating lever that enables the driver to perform brake operations and accelerator operations manually, these operations can be performed more directly.

However, when the brake or the accelerator is operated manually in a traveling apparatus for a coaxial two-wheeled vehicle such as those described above, load movement is generated by the driver due to inertia when an operation is performed during travel, for example. In this case, the load moves forward when the brake is applied, and the load moves backward when the accelerator is applied. In other words, load movement generated by inertia in this manner is opposite to load movement generated when travel control is performed as described above. Therefore, two conflicting types of control are performed, and as a result, it may be impossible to realize smooth control, particularly in relation to manual operations.

Hence, to make manual brake and accelerator operations possible in a conventional traveling apparatus for a coaxial two-wheeled vehicle, complicated measures such as blocking travel control corresponding to driver load movement when a manual operation of the brake or accelerator is performed, for example, are required. To realize such measures, a complicated control mechanism must be provided, and therefore manual brake and accelerator operations have not been realized in a conventional traveling apparatus for a coaxial two-wheeled vehicle.

This application has been designed in consideration of such points, and a problem to be solved thereby is that in a conventional apparatus, a manual operation of a brake or an accelerator conflicts with primary travel control through driver load movement, and therefore manual operations cannot be performed in combination with brake and accelerator control.

SUMMARY OF THE INVENTION

In accordance with an embodiment of the present invention, a traveling apparatus includes a plurality of wheels disposed in parallel, a vehicle body, at least one of a step plate and a seat, an operating member, and a mechanism. The vehicle body supports plurality of wheels rotatably. The step plate is coupled to the vehicle body to carry a driver in an upright attitude. The seat is coupled to the vehicle body to seat the driver. The operating member is coupled to the vehicle body and operated by the driver for inputting driver's operation including an accelerating operation and a decelerating operation. The mechanism is configured to move at least one of the step plate and the seat in a front-rear direction of the vehicle body in accordance with an operation of the operating member.

With this constitution, the conflict between a brake operation and an accelerator operation performed manually by a driver and primary travel control of the traveling apparatus is eliminated, and as a result, accelerator operations and brake operations (in other words, decelerator operation) performed manually by the driver can be used in combination with acceleration/deceleration control of the traveling apparatus.

The above and other objects, features and advantages of the present invention will become more fully understood from the detailed description given hereinbelow and the accompanying drawings which are given by way of illustration only, and thus are not to be considered as limiting the present invention.

DETAILED DESCRIPTION OF THE PREFERRED EMBODIMENTS

Figures 1A, 1B:
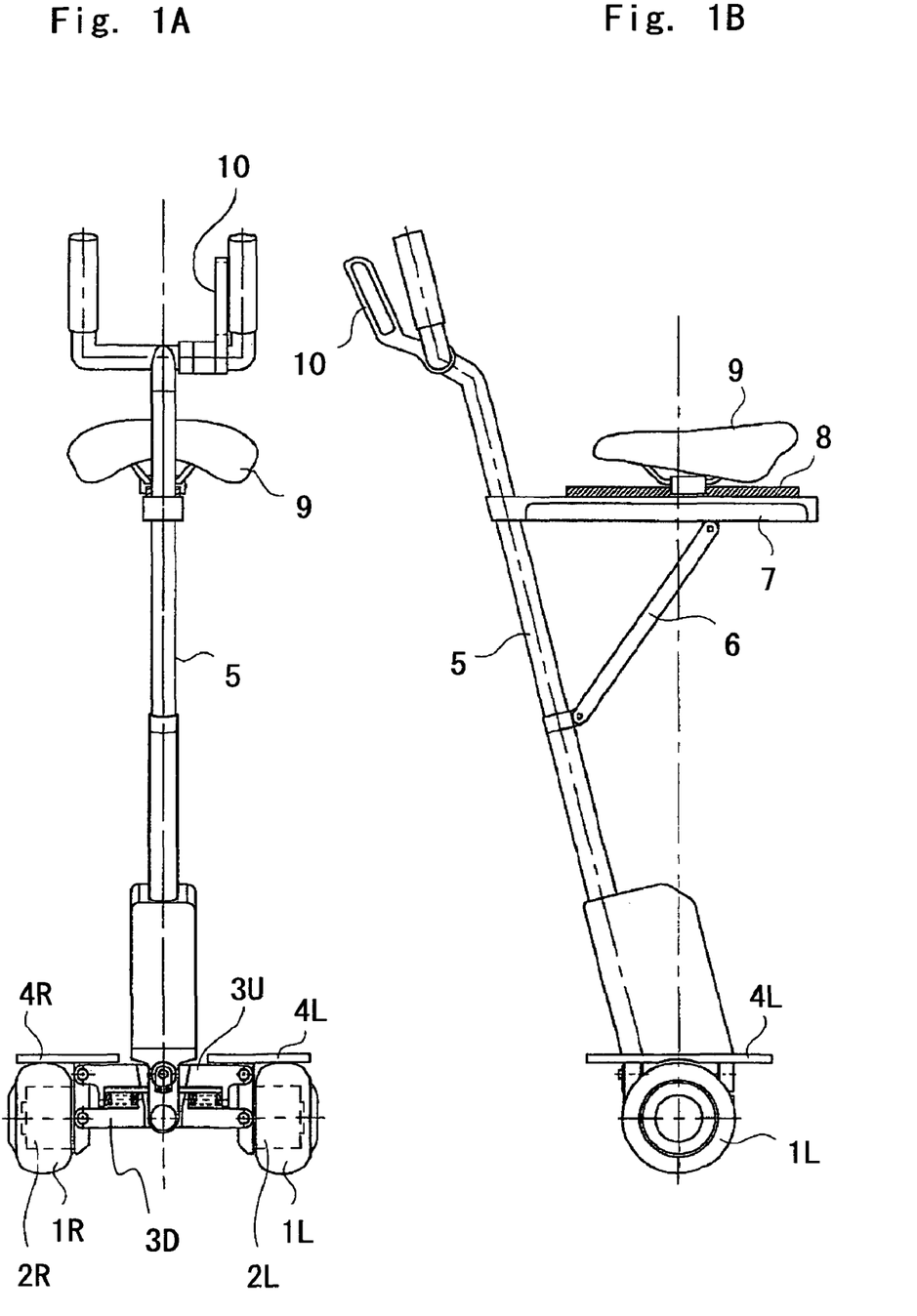
FIGS. 1A and 1B are a front view and a side view showing the constitution of a coaxial two-wheeled vehicle according to an embodiment of the present invention.

The present invention will be described below with reference to the drawings. FIGS. 1A and 1B are a front view and a side view showing the constitution of an embodiment of a coaxial two-wheeled vehicle to which a traveling apparatus according to the present invention is applied. Note that in FIGS. 1A and 1B, the main overall constitution is substantially identical to that of the apparatus disclosed in Japanese Unexamined Patent Application Publication No. 2005-6435.

In FIGS. 1A and 1B, two wheels 1L, 1R are disposed in parallel, and these wheels 1L, 1R are provided respectively with independent motors 2L and 2R. The motors 2L and 2R are connected by vehicle main bodies 3U and 3D divided into an upper side and a lower side. Although not shown in the drawing, a circuit apparatus such as a control circuit for controlling the tilt of the vehicle, which is detected by a sensor such as a gyro, and controlling driving of the motors 2L, 2R in accordance with information such as driver load on the vehicle, is provided in the vehicle main bodies 3U, 3D.

A step plate for carrying a driver is provided on an upper side of the vehicle main body 3U. The step plate includes steps 4L and 4R divided into left and right sides of the vehicle main bodies 3U. The steps 4L and 4R are connected by a link mechanism (not shown) so as to be parallel at all times. A handle 5 is provided between the steps 4L and 4R. The handle 5 is provided to be capable of tilting in a roll axis direction relative to the vehicle main bodies 3U and 3D. The handle 5 is connected to the steps 4L and 4R by a link mechanism (not shown) such that the handle 5 and the steps 4L and 4R are perpendicular to each other.

Figure 2:
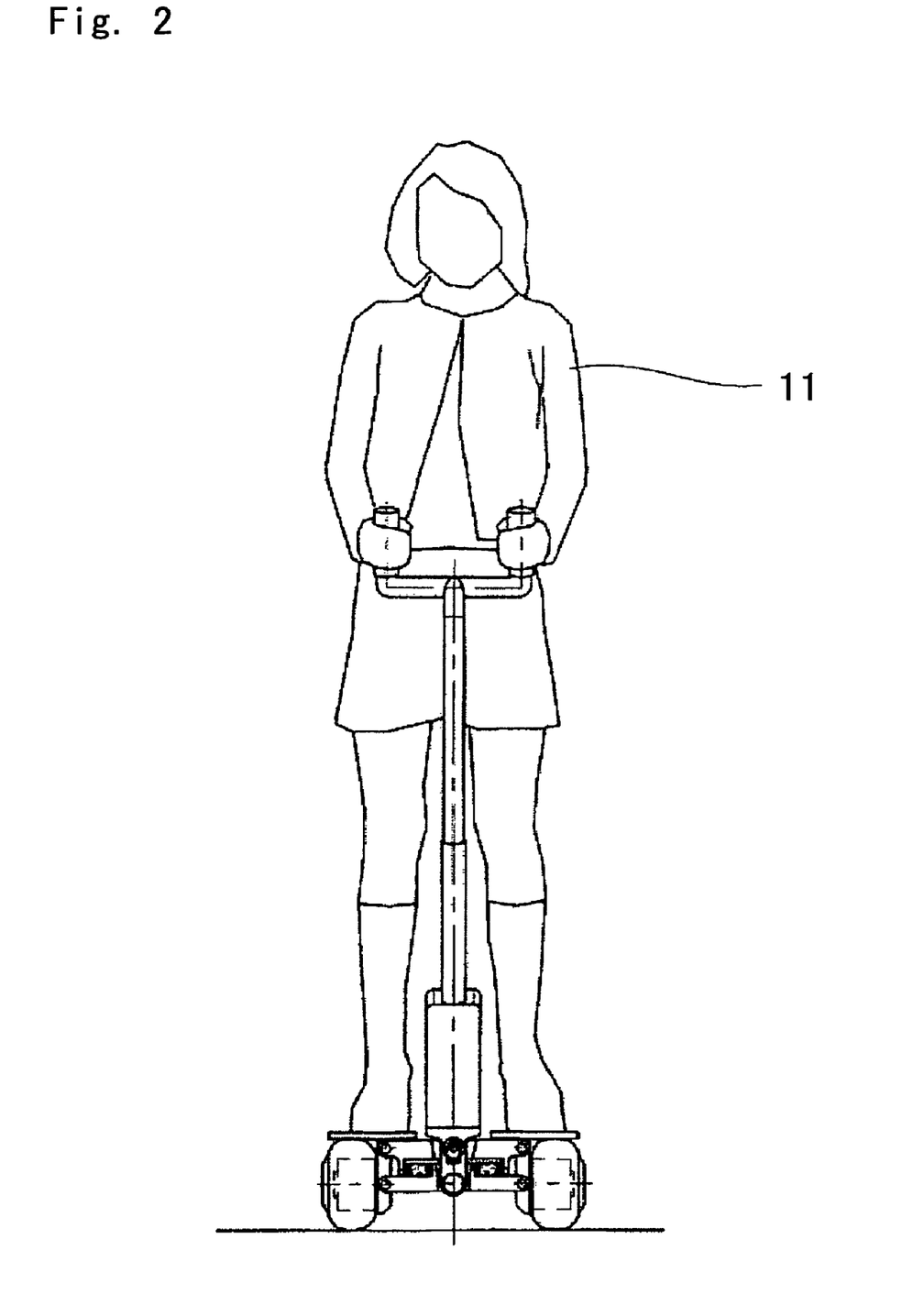
FIG. 2 is a front view showing a state of the embodiment of the present invention in which a driver is aboard.

Further, a seat carrying portion 7 is provided in an intermediate portion of the handle 5 via a support member 6. A sliding portion 8 is provided on the seat carrying portion 7, and a seat 9 is provided on the sliding portion 8. Further, an operating lever 10 is provided near a part of the upper portion of the handle 5 that is gripped by the driver (not shown). The operating lever 10 is provided to enable the driver to perform a brake operation and an accelerator operation manually in the coaxial two-wheeled vehicle according to this embodiment. Note that FIG. 2 shows a state in which a driver 11 is aboard. In FIG. 2, the driver 11 straddles the seat 9 and places his/her hand on the operating lever 10 on the upper portion of the handle 5.

Figure 3A:
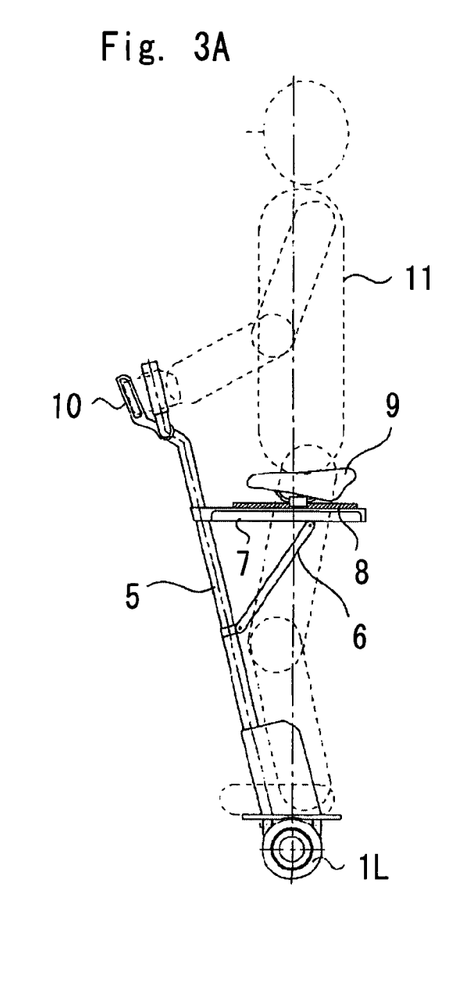
FIGS. 3A to 3C are side views showing a state of the embodiment of the present invention in which a driver is aboard.
Figure 3B:
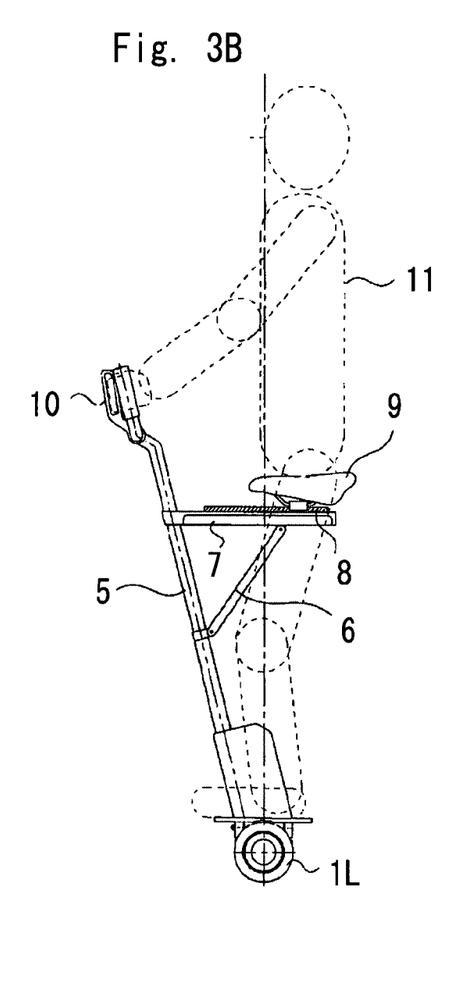

When the driver 11 applies no force to the operating lever 10, the lever 10 remains in a neutral position, as shown in FIG. 3A. At this time, the seat 9 is vertically positioned above an axle between the wheels 1R and 1L. In contrast, when the driver 11 applies the brake, force is applied in a direction for closing the lever 10, as shown in FIG. 3B. At this time, the seat 9 is moved rearward by an interlocking mechanism provided between the sliding portion 8 and the lever 10, as will be described below.

Figure 3C:
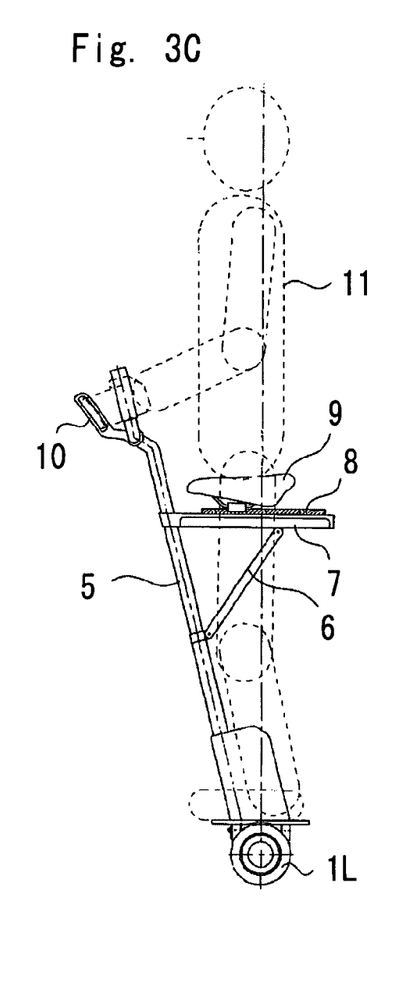

Further, when the driver 11 performs an accelerator operation to accelerate the coaxial two-wheeled vehicle according to this embodiment, force is applied in a direction for opening the lever 10, as shown in FIG. 3C. At this time, the seat 9 is moved forward by the interlocking mechanism provided between the sliding portion 8 and the lever 10, as will be described below. Hence, when the driver 11 applies the brake, the body of the driver 11 is moved rearward, and when the driver 11 applies the accelerator, the body of the driver 11 is moved forward. The directions of the load movements generated by these body movements are identical to the directions of the load movements generated when the travel control described above is performed.

Note that the relationship shown in FIGS. 3A to 3C between the operation direction of the operating lever 10 and the brake operation and accelerator operation is merely an example. For example, an accelerator operation may be performed by applying force in a direction for closing the operating lever 10. Further, the operating direction of the operating lever 10 and the front-rear direction of the coaxial two-wheeled vehicle according to this embodiment do not have to match. Furthermore, the operating lever 10 is merely an example of an operating member or inputting driver's operation including an accelerating operation and a decelerating operation. For example, a joy-stick, an operating dial or a push button may be used instead of the operating lever 10.

As shown in FIGS. 4A to 4D, the interlocking mechanism between the sliding portion 8 and the lever 10 is constructed using wires and a gear mechanism, for example. Here, when the lever 10 is operated, a first wire 81 wrapped around a rotational shaft thereof is moved, and as a result, a gear mechanism 82 coupled to the wire 81 is driven. When the gear mechanism 82 is driven, a second wire 83 is moved, and as a result, the seat 9, which is attached to the wire 83, moves forward and backward. Further, springs 84 and 85 are provided on an attachment portion of the seat 9 such that when no load is applied, the seat 9 is adjusted onto the vertical of the axle of the wheels 1R and 1L.

Figures 4A, 4B:
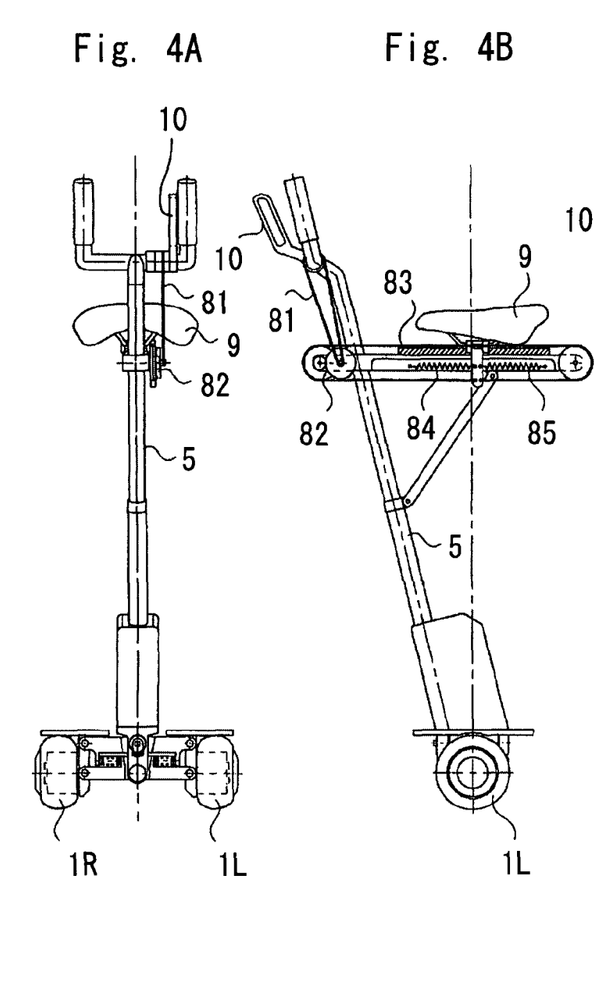
FIGS. 4A to 4D are schematic diagrams showing a configuration example of an interlocking mechanism included in the embodiment of the present invention.
Figure 4C:
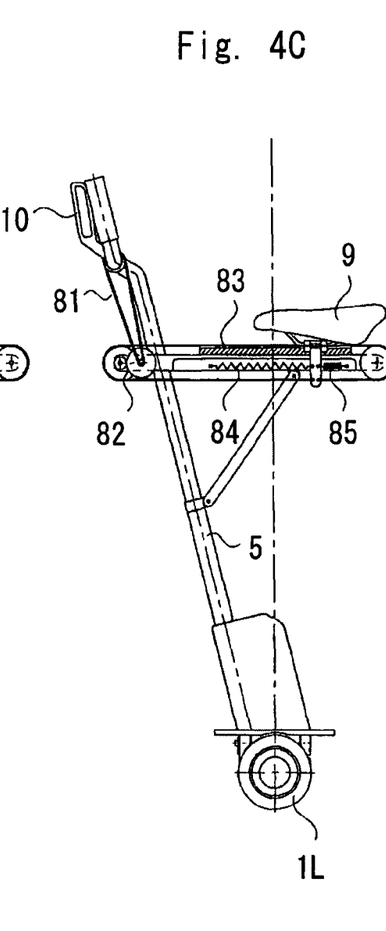
Figure 4D:
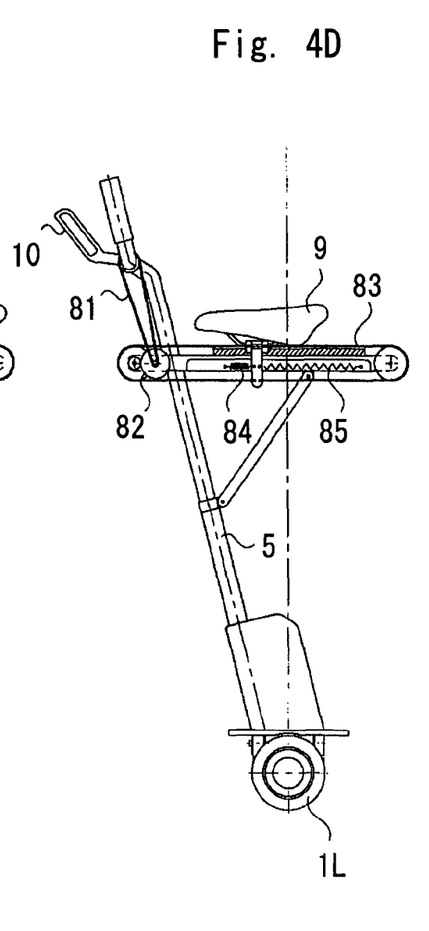

Hence, when the lever 10 is in the neutral position, as shown in FIG. 4B, the seat 9 is positioned on the vertical of the axle connecting the wheels 1R and 1L. Then, when the driver 11 applies force in the direction for closing the lever 10 in order to apply the brake, the seat 9 is moved to the rear of the vertical of the axle between the wheels 1R and 1L, as shown in FIG. 4C. Further, when the driver 11 applies force in the direction for opening the lever 10 in order to apply the accelerator, the seat 9 is moved to the front of the vertical of the axle between the wheels 1, as shown in FIG. 4D. Note that FIG. 4A shows a front view.

Figure 5A:
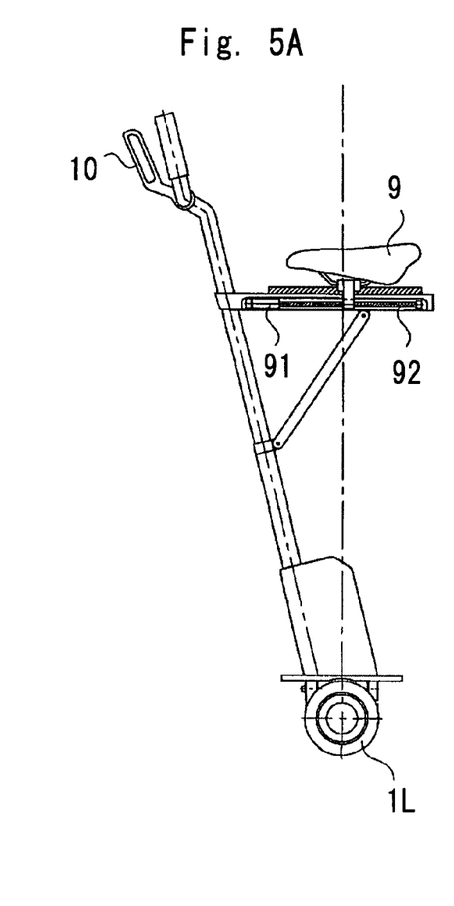
FIGS. 5A to 5C are schematic diagrams showing a configuration example of an interlocking mechanism included in the embodiment of the present invention.
Figure 5B:
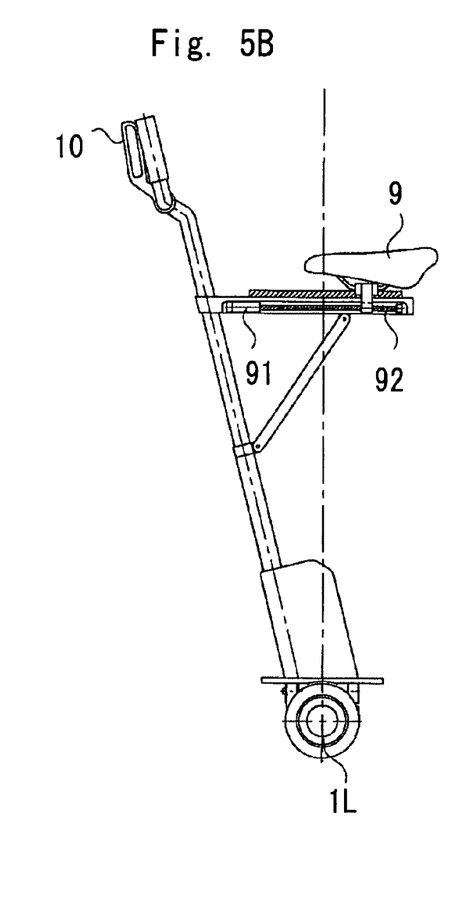
Figure 5C:
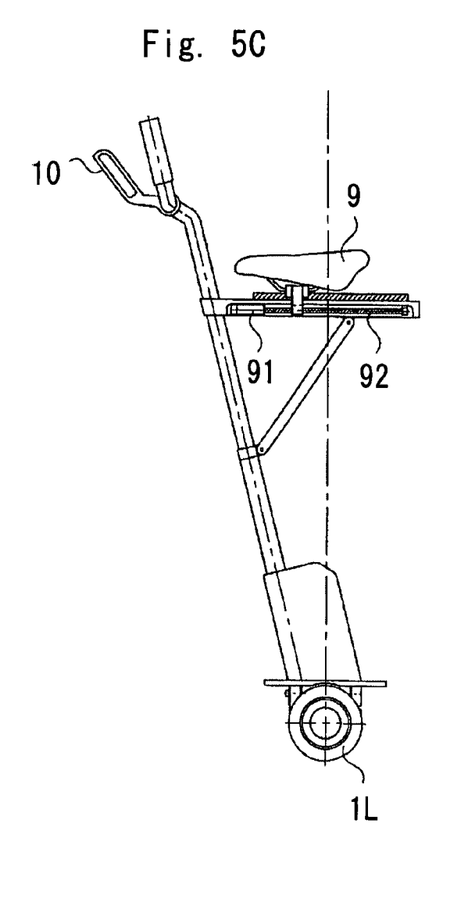

Alternatively, the interlocking mechanism may be constructed using a mechanism including a seat slider motor 91 and a ball screw 92, for example, as shown in FIGS. 5A to 5C. In this mechanism, the motor 91 is driven in accordance with the position of the lever 10, thereby rotating the ball screw 92 such that the seat 9 is moved to an arbitrary position. Hence, when the lever 10 is in the neutral position, as shown in FIG. 5A, the seat 9 also remains in an intermediate position. When the lever 10 is closed, as shown in FIG. 5B, the seat 9 can be moved rearward, and when the lever 10 is opened, as shown in FIG. 5C, the seat 9 can be moved forward.

Next, a specific constitution of a single wheel-model control apparatus will be described using the pattern diagram in FIG. 6. Note that in an actual coaxial two-wheeled vehicle, the sensors of the step 4 may be shared between steps 4R and 4L. Further, control of the motor 2 connected to the wheel 1 in the illustrated model is performed using independent control apparatus in the motors 2L and 2R connected to the wheels 1L and 1R shown in FIGS. 1 to 5.

Figure 6:
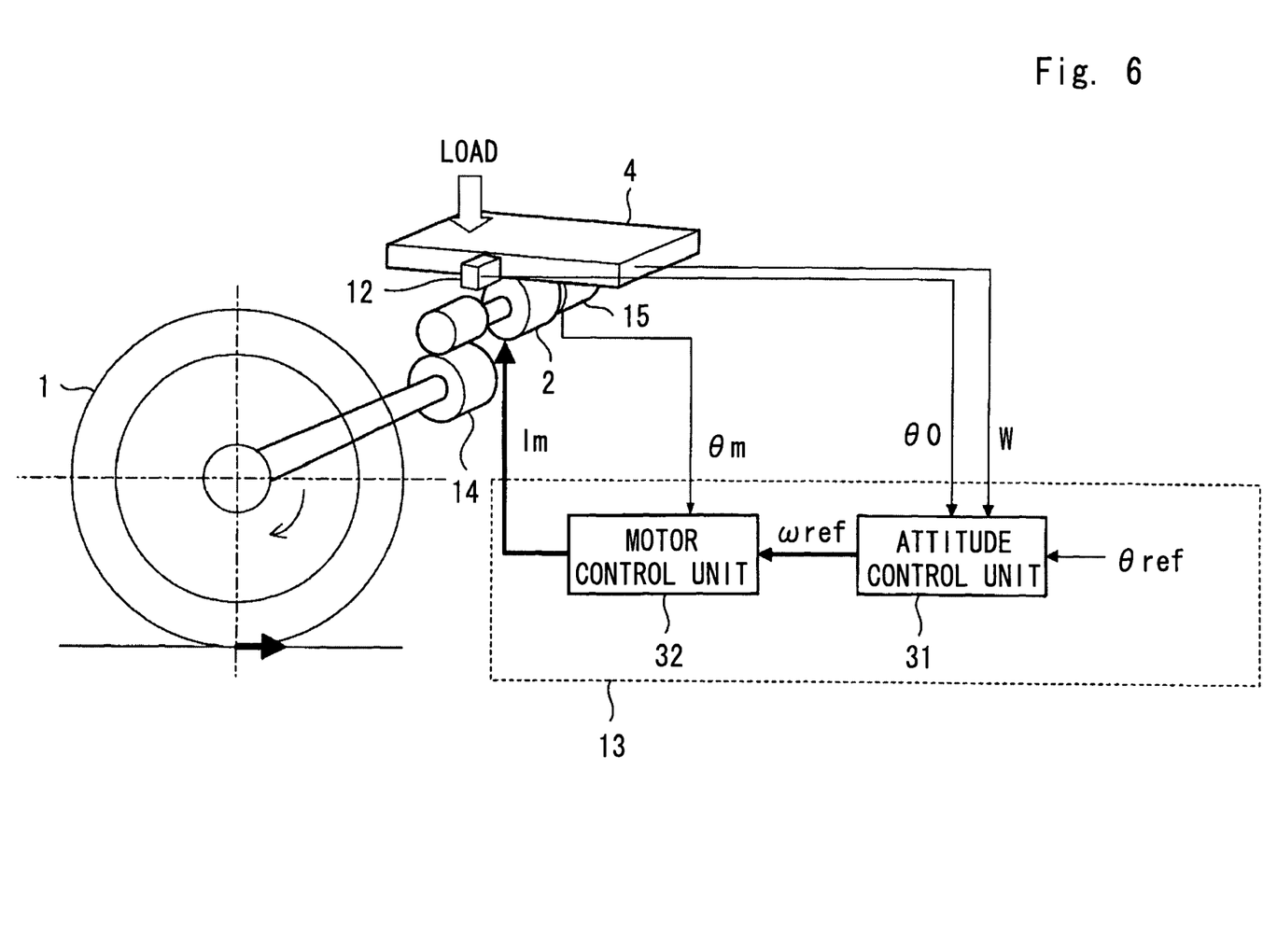
FIG. 6 is a pattern diagram showing a specific constitution of a single wheel-model control apparatus.

In FIG. 6, a load detection signal W output from a load sensor (not shown) installed in the step 4 and a main body attitude angle detection signal $\theta 0$ output from an attitude sensor 12 connected to the step 4 are supplied to an attitude control unit 31 in a control device 13. Here, the attitude sensor 12 is a gyro sensor or an acceleration sensor, for example. The detection signals W and $\theta 0$ and a main body attitude command signal θref issued externally by the driver or the like are then computed, whereby a rotation command value ωref is calculated. The calculated rotation command value ωref is supplied to a motor control unit 32.

The wheel 1 is connected to the motor 2 via a decelerator 14. The motor 2 is provided with a rotary angle detector 15. A motor rotary angle position signal θm from the rotary angle detector 15 is supplied to the motor control unit 32 in the control device 13. Thus, a drive current to be supplied to the motor 2, which is generated in accordance with the aforementioned rotation command value ωref, is feedback-controlled, and as a result, driving of the wheel 1 is stabilized. Hence, the wheel 1 is driven with stability, and the driving of the wheel 1 is controlled in accordance with the main body attitude angle detection signal θ0 from the attitude sensor 12, and so on.

Figure 7:
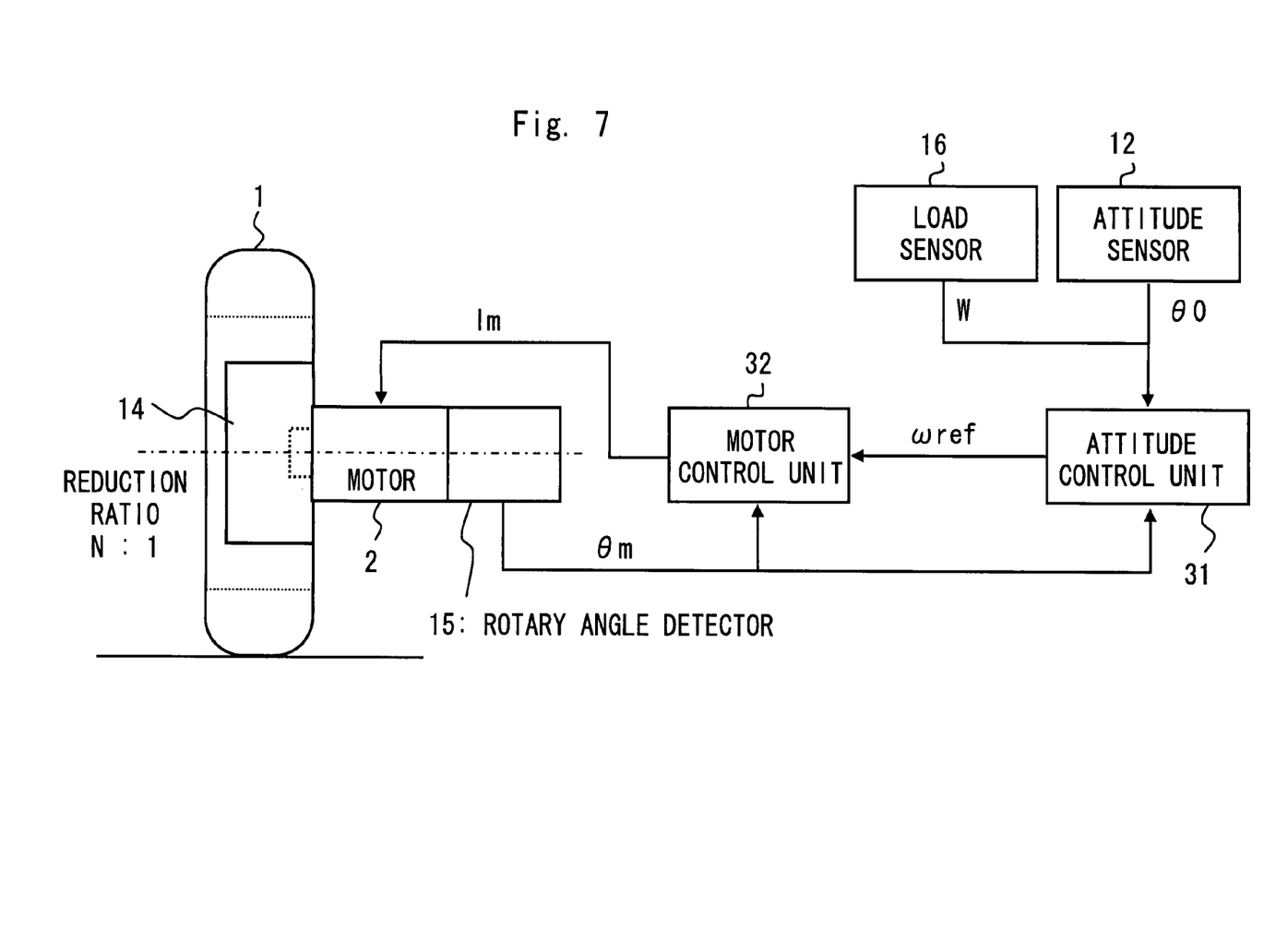
FIG. 7 is a block diagram illustrating the constitution shown in FIG. 6.

FIG. 7 is a block diagram illustrating the constitution shown in FIG. 6 in further detail. In FIG. 7, identical reference symbols have been allocated to parts corresponding to FIG. 6, and detailed description thereof has been omitted. In FIG. 7, the motor 2 is connected to the wheel 1 via the decelerator 14. Further, the rotary angle detector 15 is connected to the motor 2. The load detection signal W output from a load sensor 16 installed in the step (not shown) and the main body attitude angle detection signal θ0 output from the attitude sensor 12 are supplied to the attitude control unit 31, and the calculated rotation command value ωref is supplied to the motor control unit 32.

Figure 8:
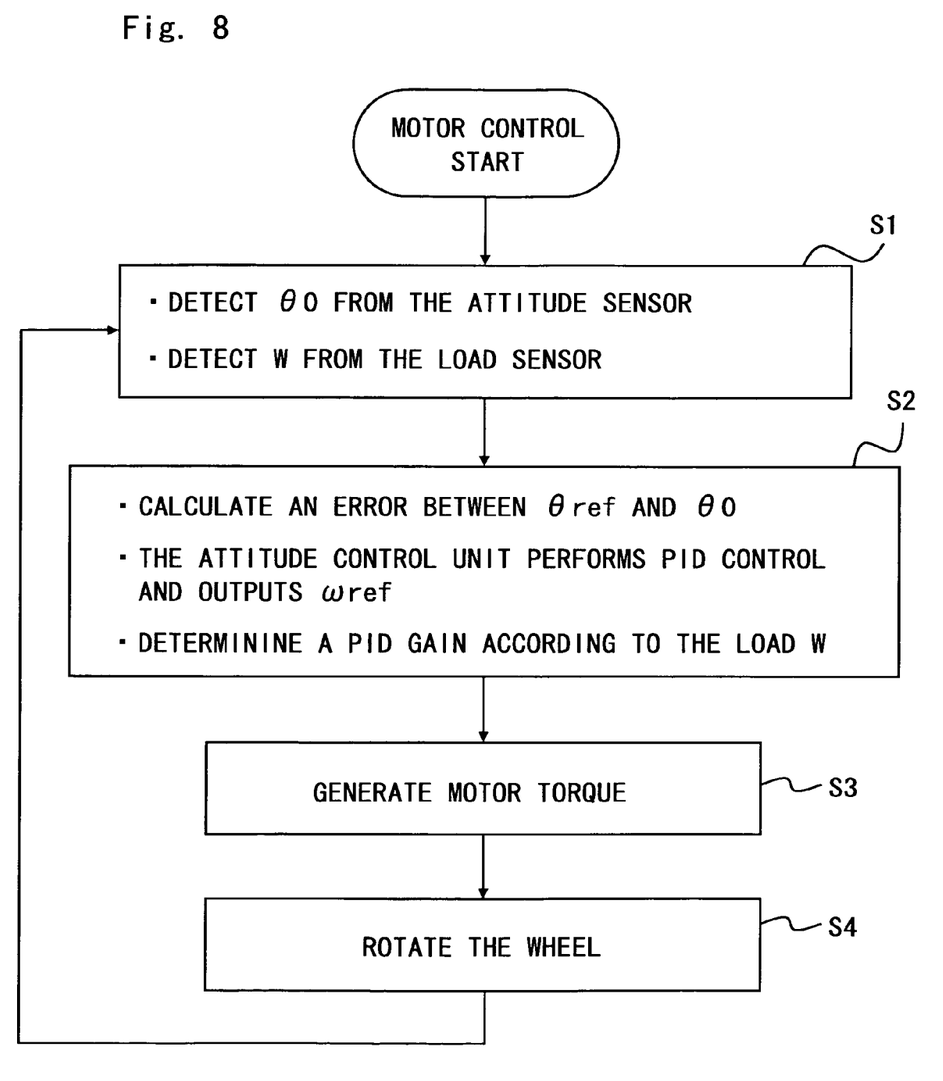
FIG. 8 is a flowchart of a control operation by the constitution shown in FIG. 7.

When the control apparatus is constituted in this manner, a control operation is performed as shown in a flowchart of FIG. 8, for example. In FIG. 8, when motor control begins, first, the current main body attitude angle detection signal θ0 is detected by the attitude sensor 12 and the load detection signal W is detected by the load sensor 16 (step S1).

Next, an error between the main body attitude command signal θref and the current main body attitude angle detection signal θ0 is calculated, whereupon the rotation command value ωref is output by the attitude control unit 31, which performs PID (Proportional-Integral-Derivative) control, such that the error becomes zero. Note that a PID gain is determined according to the load W (step S2). Further, a motor torque is generated in accordance with the rotation command value ωref (step S3), whereupon the wheel 1 is rotated (step S4).

Hence, with this constitution, when a load vector of the driver (not shown) moves to the rear or the front of a ground contact point of the wheel 1, the motor 2 is driven through so-called inverted pendulum control to maintain balance, and as a result, the vehicle is driven to accelerate/decelerate so as to maintain its attitude. Thus, control is performed such that when the center of gravity of the driver (not shown) shifts forward, the vehicle accelerates, and when the center of gravity of the driver shifts rearward, the vehicle decelerates, for example.

Figure 9:
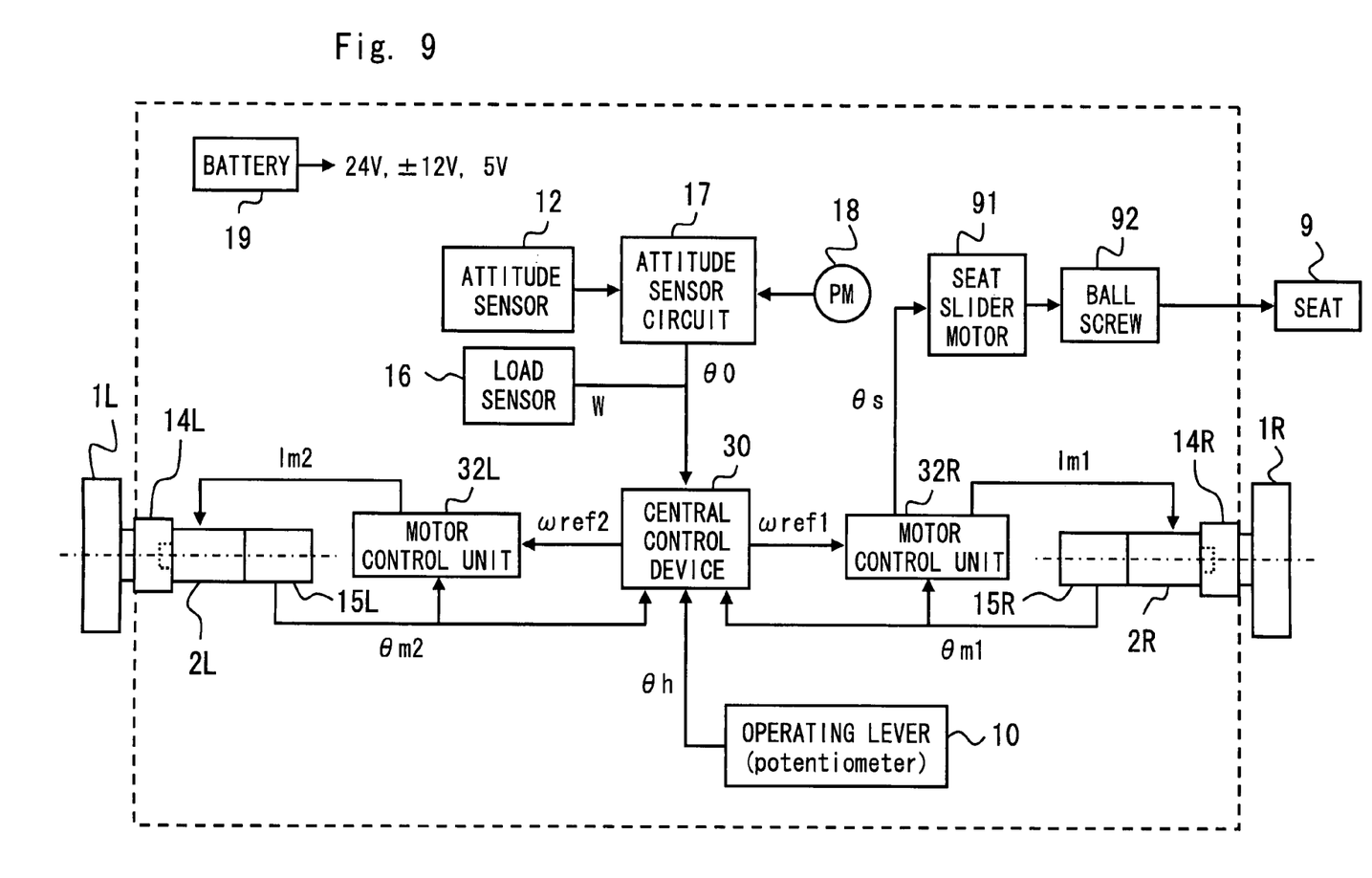
FIG. 9 is a block diagram showing a constitution in which the processing of the operating lever is added to the constitution shown in FIG. 7.

FIG. 9 is a block diagram showing a constitution in which the processing of the operating lever 10 is added to the constitution shown in FIG. 7 when the constitution shown in FIG. 7 is applied to a two-wheeled vehicle. In FIG. 9, parts that correspond to FIG. 7 have been allocated identical reference symbols, and detailed description thereof has been omitted.

In the example of FIG. 9, a signal from the attitude sensor 12 is supplied to an attitude sensor circuit 17, and a signal from a rotation potentiometer 18 is supplied to the attitude sensor circuit 17. The rotation potentiometer 18 is provided on a base portion of the handle 5, for example. The current main body attitude angle detection signal θ0 calculated by the attitude sensor circuit 17 is supplied to a central control device 30 including the attitude control unit 31. Further, the load detection signal W is supplied to the central control device 30 from the load sensor 16. In the central control device 30, rotation command values ωref1 and ωref2 for drive-controlling the left and right wheels 1L and 1R are generated.

The generated rotation command values ωref1 and ωref2 are supplied to motor control units 32L and 32R, respectively. Motor currents Im1 and Im2 are then supplied to the motors 2L and 2R from the motor control units 32L and 32R. As a result, the wheels 1L and 1R are driven via the decelerators 14L and 14R. Further, motor rotary angle position signals θm1 and θm2 from the rotary angle detectors 15L and 15R are supplied to the motor control units 32L and 32R and the central control device 30 and subjected to feedback control.

In the example of FIG. 9, a lever angle θh of the operating lever 10 is detected by a potentiometer, for example, and supplied to the central control device 30. A rotation command value θs generated by the central control device 30 is then supplied to the seat slider motor 91. The rotation of the motor 91 is converted into linear motion by the ball screw 92, whereby the seat 9 is moved. Note that in these circuit devices, 24V, ±12V, 5V, and so on are supplied from a battery 19 as circuit power.

Figure 10:
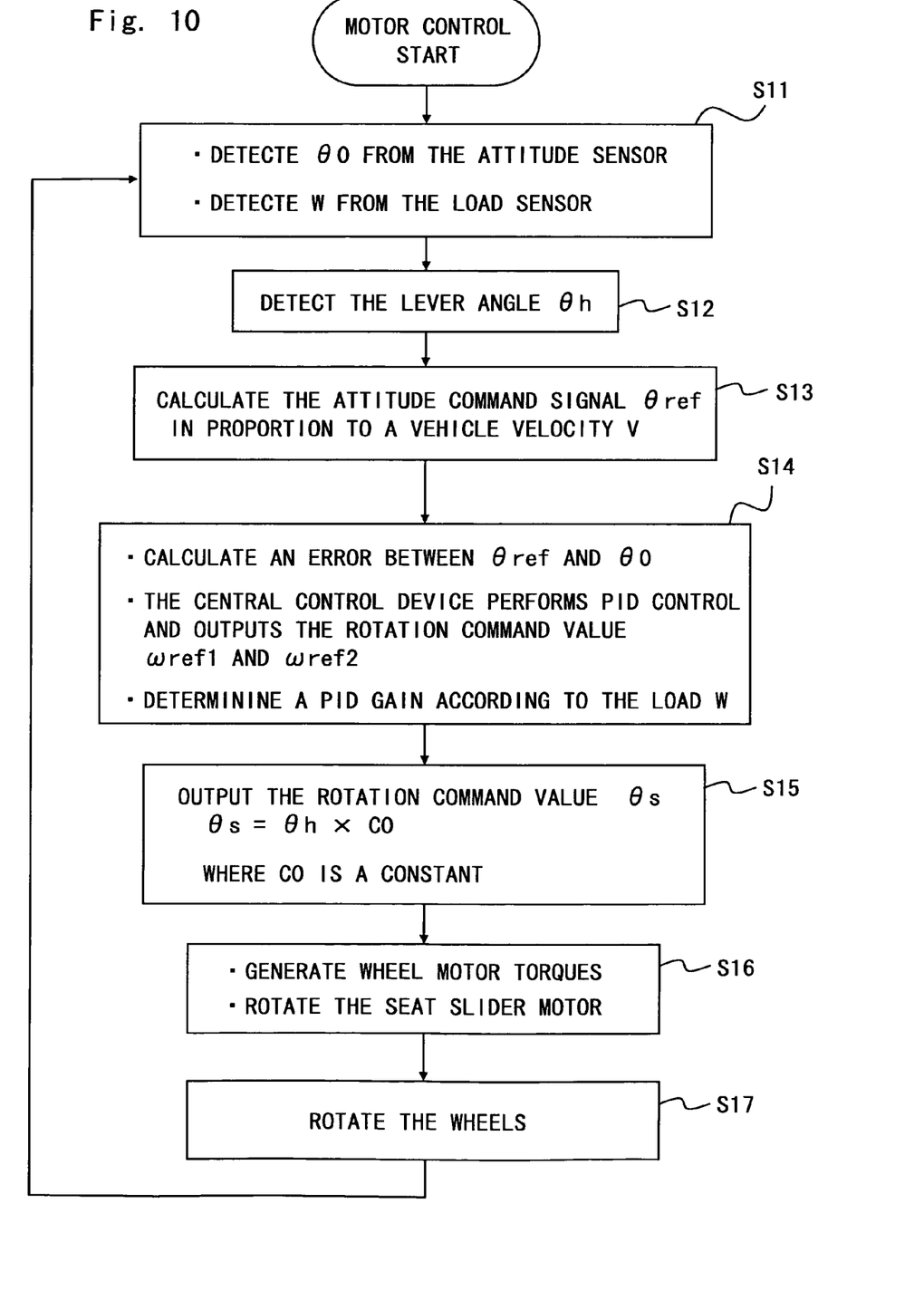
FIG. 10 is a flowchart of a control operation by the constitution shown in FIG. 9.

In the control apparatus constituted in this manner, a control operation is performed in accordance with the flowchart shown in FIG. 10, for example. In FIG. 10, when motor control begins, first, the current main body attitude angle detection signal θ0 is output from the attitude sensor 12 and the load detection signal W is output from the load sensor 16 (step S11).

Next, the lever angle θh of the operating lever 10 is detected by a potentiometer (not shown) provided on the operating lever 10 (step S12). The central control device 30 then calculates a step attitude command signal θref that is proportionate to a vehicle velocity V using the following equation, for example (step S13).

$$\theta\text{ref}=(A1+B0\times\theta h)\times V$$

where A1 and B0 are positive constants.

Further, the central control device 30 calculates an error between the attitude command signal θref and the current main body attitude angle detection signal θ0. The central control device 30 then performs PID control to make the calculated error zero, and outputs the motor command values ωref1 and ωref2. Note that the PID gain is determined according to the load W (step S14). The central control device 30 then generates the rotation command value θs to be issued to the seat slider motor 91 using the following equation (step S15).

$$\theta s=\theta h\times C0$$

where C0 is a constant.

Figure 11:
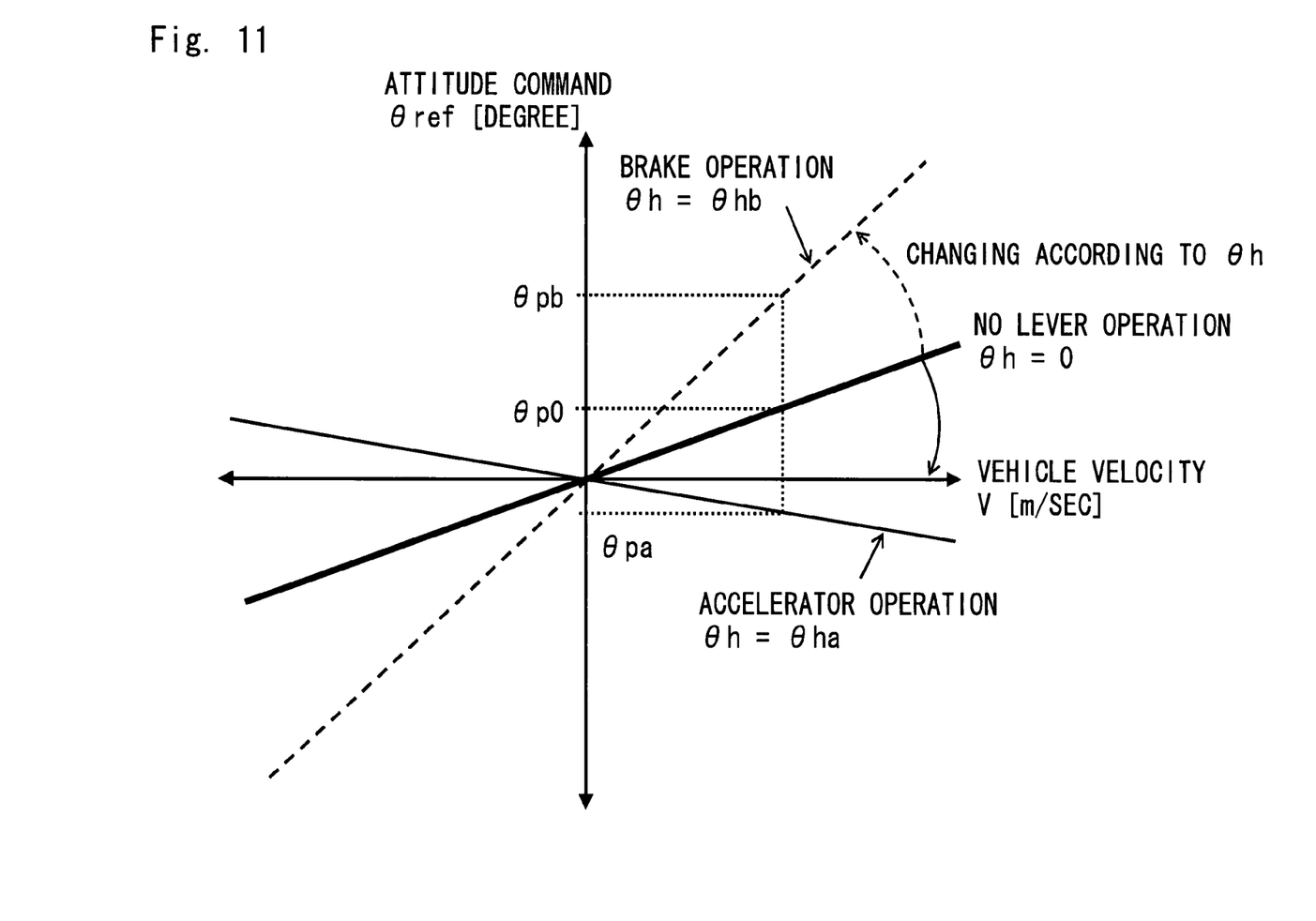
FIG. 11 is a graph indicating a relation between the vehicle velocity V, the step attitude command signal θref, and the lever angle θh.

The wheel motor torque is then generated in accordance with the motor command value ωref1 and ωref2, whereupon the seat slider motor 91 is rotated in accordance with the command output θs (step S16). As a result, the wheels 1L and 1R are driven to rotate, and the seat 9 is caused to slide (step S17). Note that the relationship between the vehicle velocity V, the step attitude command signal θref, and the lever angle θh of the operating lever 10 is as shown in FIG. 11.

Figure 12A:
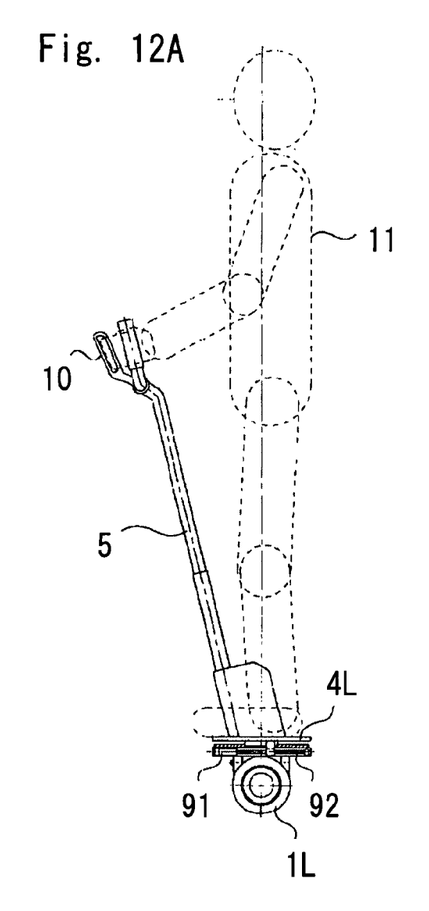
FIGS. 12A to 12C are schematic diagrams showing a coaxial two-wheeled vehicle according to another embodiment of the present invention.
Figure 12B:
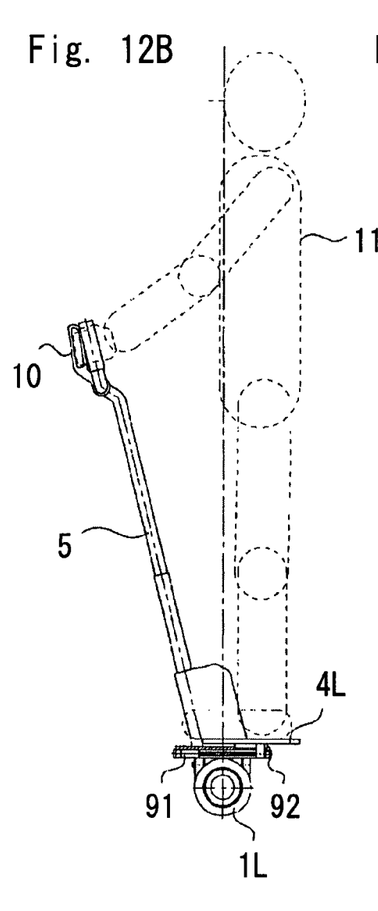
Figure 12C:
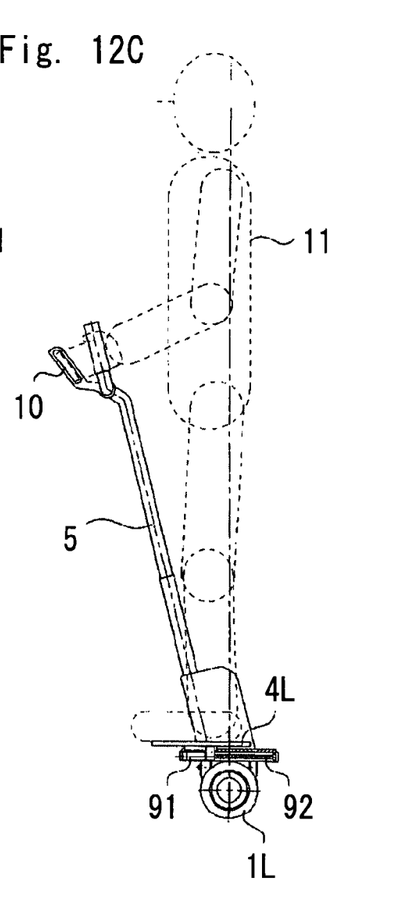

FIGS. 12A to 12C show an apparatus according to another embodiment, in which center of gravity movement is realized by moving the step 4 instead of the seat 9. Specifically, in this embodiment, the mechanism constituted by the motor 91 and the ball screw 92, shown in FIG. 5, may be provided under the step 4. When the driver 11 does not apply force to the operating lever 10, the lever 10 remains in the neutral position, as shown in FIG. 12A. At this time, the step 4 is vertically positioned above the axle between the wheels 1.

In contrast, when the driver 11 applies the brake, force is applied in a direction for closing the lever 10, as shown in FIG. 12B. At this time, the motor 91 and ball screw 92 are driven such that the step 4 moves rearward. Further, when the driver 11 applies the accelerator, force is applied in a direction for opening the lever 10, as shown in FIG. 12C. At this time, the motor 91 and ball screw 92 are driven such that the step 4 moves forward.

Hence, when the driver 11 applies the brake, the body of the driver 11 is moved rearward. Conversely, when the driver 11 applies the accelerator, the body of the driver 11 is moved forward. The directions of load movements generated by these body movements of the driver 11 are identical to the directions of the load movements generated when the travel control described above is performed such that the attitude of the entire vehicle varies as shown in FIGS. 13A and 13B when the driver 11 applies the brake and the accelerator, for example.

In the traveling apparatus according to the embodiments described above, when a brake operation is performed using the operating lever 10 connected to the handle, for example, the seat 9 or the steps 4L and 4R coupled to the operating lever 10 is/are caused to slide backward by wires or an electric operation. As a result, the center of gravity of the driver moves backward. Hence, when advancing from inverted pendulum control, torque acts in a deceleration direction, causing the coaxial two-wheeled vehicle to decelerate. Meanwhile, when the operating lever 10 is operated in an opposite direction, the seat 9 or the steps 4L and 4R slide(s) forward. As a result, the center of gravity of the driver moves forward, causing the coaxial two-wheeled vehicle to accelerate in an advancement direction.

Here, when a center of gravity vector of the operator moves to the rear or the front of the tire ground contact point, the motor is driven through inverted pendulum control to maintain balance. Thus, the vehicle accelerates or decelerates so as to maintain an inverted attitude. In other words, when the seat 9 or the steps 4L and 4R move(s) in response to an operation of the operating lever 10, the center of gravity position of the driver moves in the front-rear direction, as shown in FIG. 3B or 3C, thereby varying the attitude of the vehicle. To ensure that the vehicle is maintained in an inverted state even when the attitude of the vehicle varies in this manner, the vehicle is accelerated or decelerated by driving the motors 2L and 2R using the control apparatus of FIG. 6, thereby maintaining the attitude through inverted pendulum control.

Figure 13A:
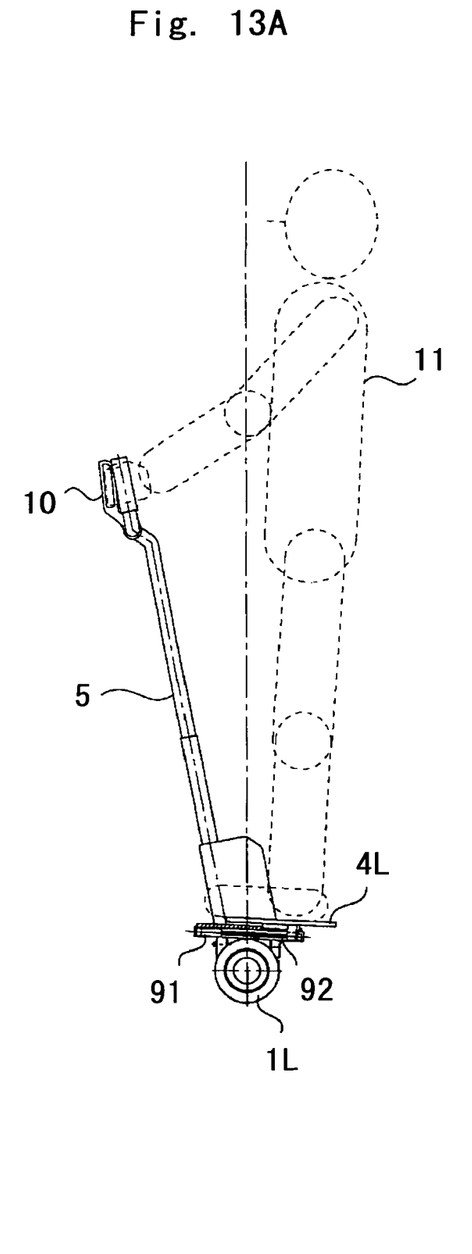
FIG. 13A is schematic diagrams showing an attitude of the vehicle when the driver applies the brake.
Figure 13B:
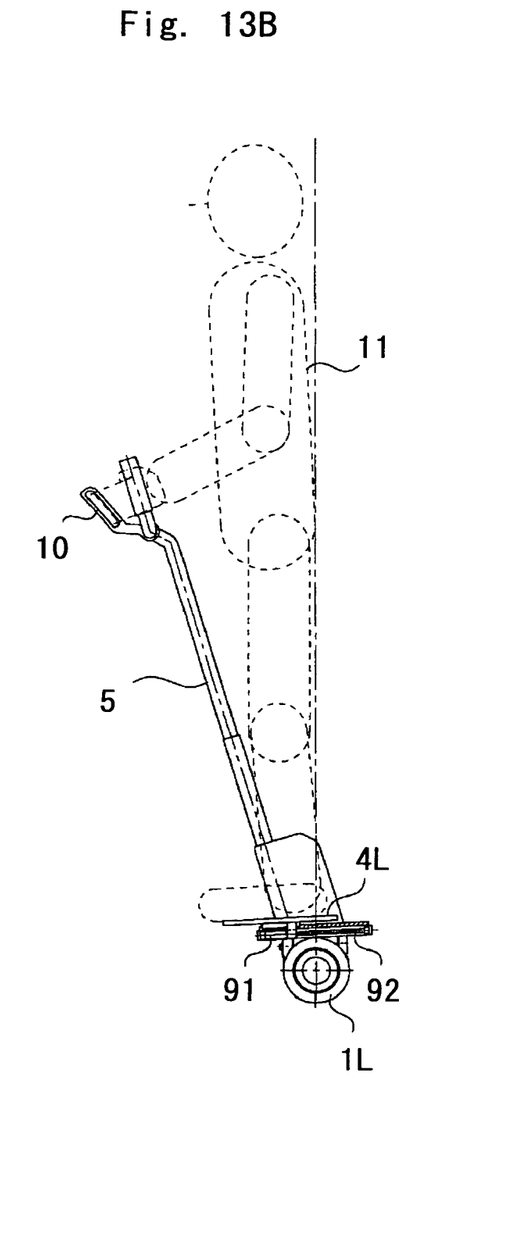
FIG. 13B is schematic diagrams showing an attitude of the vehicle when the driver applies the accelerator.

Further, as shown in FIG. 11, by varying the gradient of variation in the control command (the main body attitude angle command θref), which varies in proportion to the vehicle velocity V, in accordance with the magnitude of the lever angle θh, the vehicle is controlled such that a combined vector of the gravity vector of the driver and the inertia vector matches the wheel ground contact point, or in other words as shown in FIGS. 13A and 13B. Hence, a sudden stop or acceleration can be performed while maintaining the stability of the driver. Thus, the vehicle can accelerate and decelerate through the control shown in FIG. 10, without the need for variation in the attitude of the driver. As a result, the vehicle velocity can be adjusted by adjusting the operating lever 10.

Hence, the traveling apparatus according to this embodiment has the plurality of wheels 4L and 4R disposed in parallel, at least one of the step plates 4L and 4R for carrying a driver and the seat 9 for supporting the driver, the operating lever 10 that is operated by the driver, and a mechanism for moving at least one of the step plates 4L and 4R and the seat 9 forward and backward in accordance with an operation of the operating lever 10. Thus, travel control corresponding to an operation of the operating lever, which is performed by the driver with the intention of implementing an accelerator operation or a brake operation, is performed favorably in a coaxial two-wheeled vehicle.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A traveling apparatus comprising:
   a plurality of wheels disposed in parallel;
   a vehicle body for supporting the plurality of wheels rotatably;
   at least one of a step plate that is coupled to the vehicle body to carry a driver in an upright attitude and a seat that is coupled to the vehicle body to seat the driver;
   a lever that is coupled to the vehicle body and operated by the driver for inputting driver's operation including an accelerating operation and a decelerating operation; and
   a mechanism for moving relative to the vehicle body at least one of the step plate and the seat in a front-rear direction of the vehicle body in accordance with an operation of the lever.

2. The traveling apparatus according to claim 1, wherein the operation of the lever is associated with acceleration and deceleration of the traveling apparatus such that the mechanism moves at least one of the step plate and the seat in a forward direction of the vehicle body when an acceleration instruction is issued through the lever, and the mechanism moves at least one of the step plate and the seat in a rearward direction of the vehicle body when a deceleration instruction is issued through the lever.

3. The traveling apparatus according to claim 1, wherein the vehicle body comprises a vehicle main body and a handle that extends from the vehicle main body and is gripped by the driver, and the lever is fixed to the handle.

4. The traveling apparatus according to claim 1, wherein the mechanism comprises a slider that slides in the front-rear direction in conjunction with the operation of the lever, the slider being connected fixedly to at least one of the step plate and the seat.

5. The traveling apparatus according to claim 1, wherein the mechanism comprises:
   a circuit that extracts the operation of the lever, which is performed by the driver, as an electric signal; and
   moving means that move at least one of the step plate and the seat in accordance with the electric signal.

6. The traveling apparatus according to claim 1, wherein the mechanism moves at least one of the step plate and the seat such that an angle $\theta\text{ref}$ of the vehicle body relative to a rotational axis of the wheels satisfies the following equation:

$$\theta\text{ref} = (A1 + B0 \times \theta h) \times V$$

where A1 and B0 are positive constants,

V being a rotation speed of the wheels and $\theta h$ being an operation angle of the lever.

7. The traveling apparatus according to claim 1, wherein the mechanism comprises:

a motor that generates a drive force for moving at least one of the step plate and the seat; and a control device for supplying a rotation command value $\theta s$ to the motor, and the rotation command value $\theta s$ is generated to satisfy the following equation:

$$\theta s = \theta h \times C0$$

where C0 is a constant, $\theta h$ being an operation angle of the lever.

* * * * *